No. 685,795. Patented Nov. 5, 1901.
C. J. REED.
MEANS FOR OPERATING AND CONTROLLING ELECTRIC MOTORS.
(Application filed Mar. 22, 1899.)
(No Model.) 4 Sheets—Sheet 1.
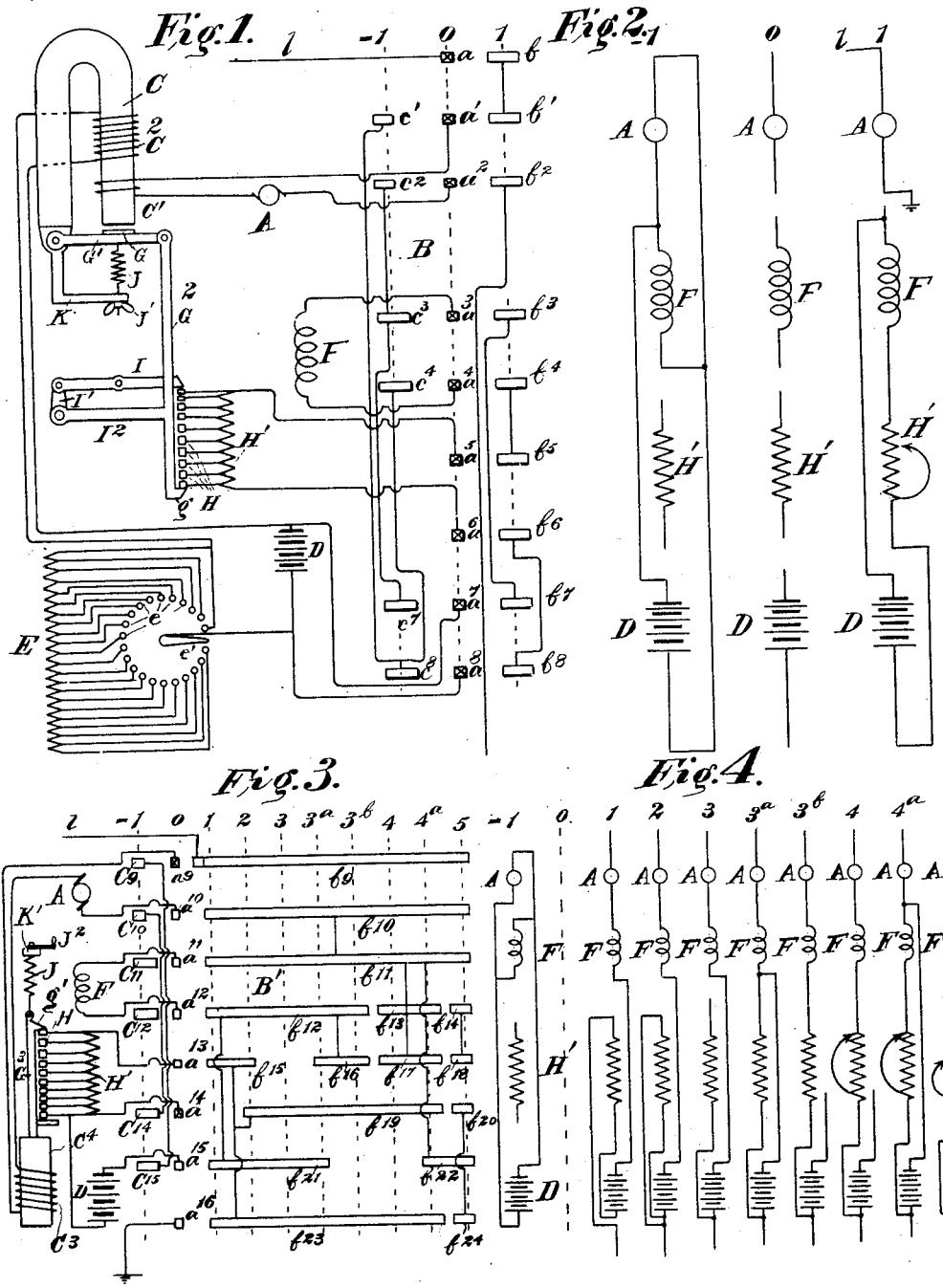
WITNESSES:
INVENTOR
Charles J. Reed
BY
Wesley G. Carr
ATTORNEY.

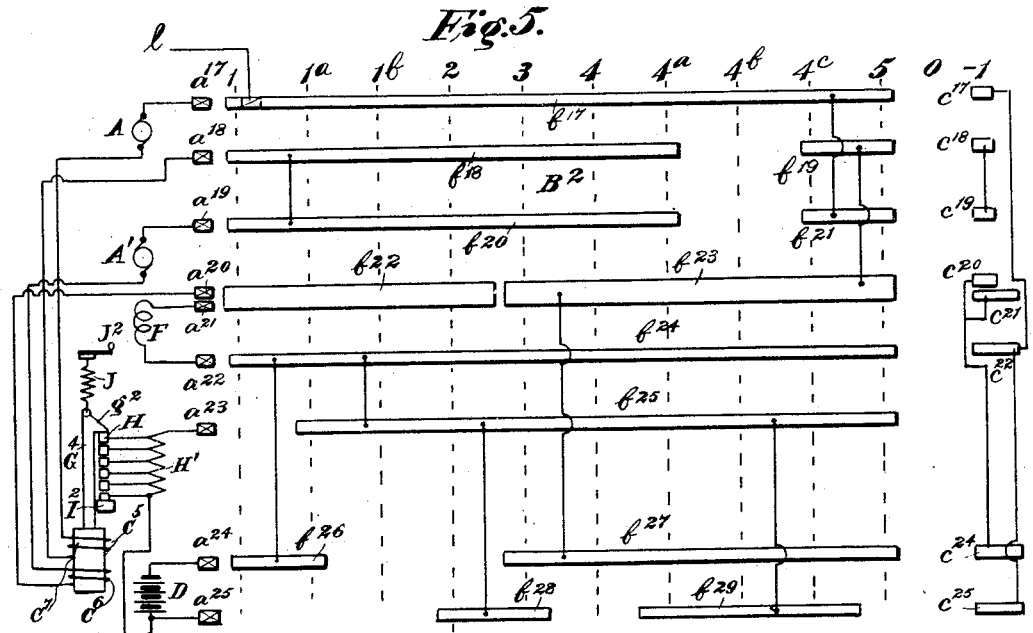
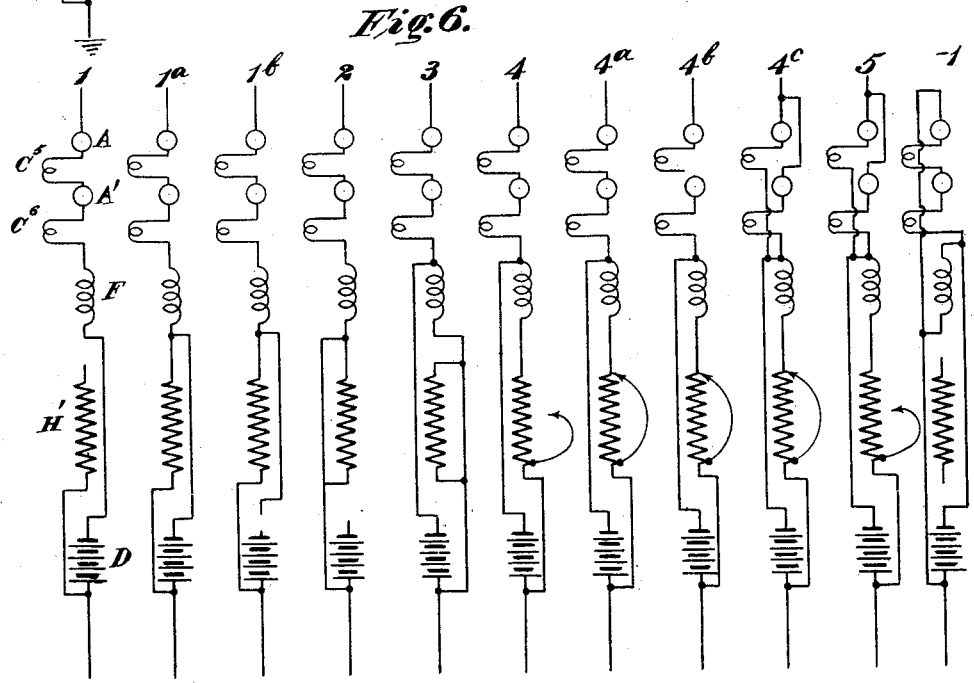

No. 685,795. Patented Nov. 5, 1901.
C. J. REED.
MEANS FOR OPERATING AND CONTROLLING ELECTRIC MOTORS.
(Application filed Mar. 22, 1899.)
(No Model.) 4 Sheets—Sheet 3.
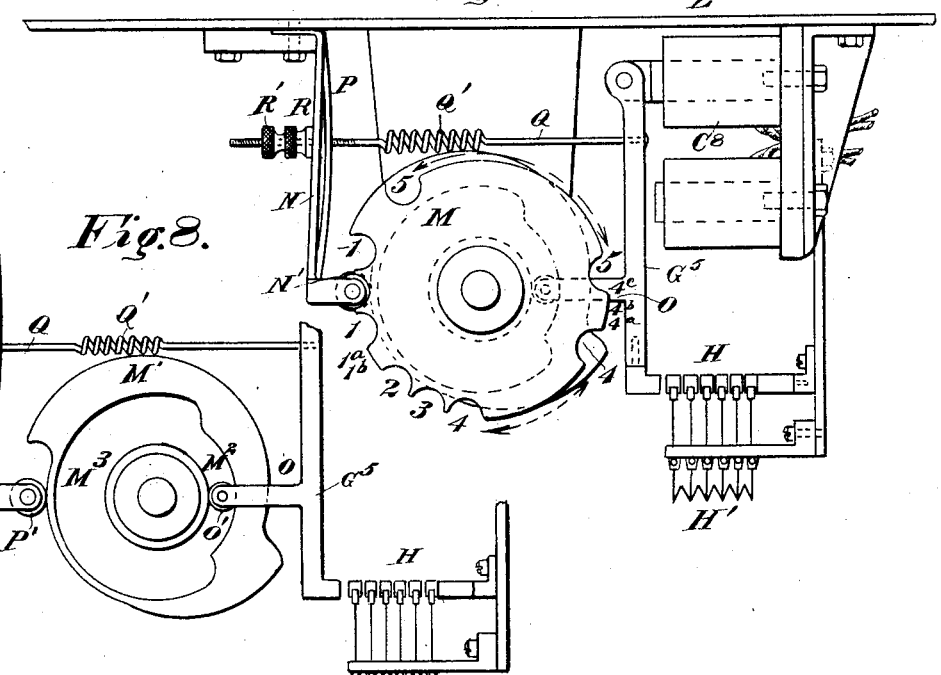
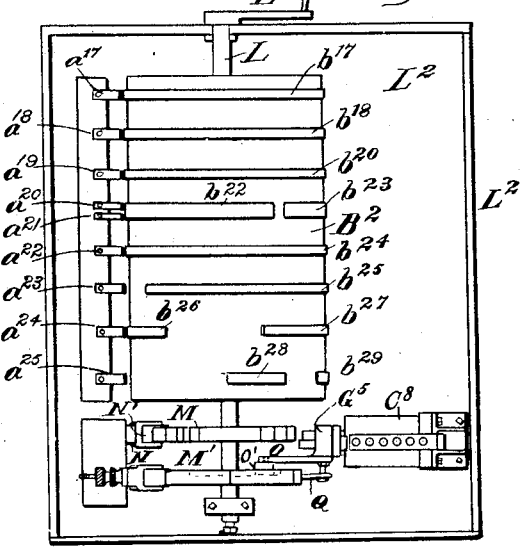
WITNESSES:
INVENTOR
Charles J. Reed
BY
Wesley G. Carr
ATTORNEY.

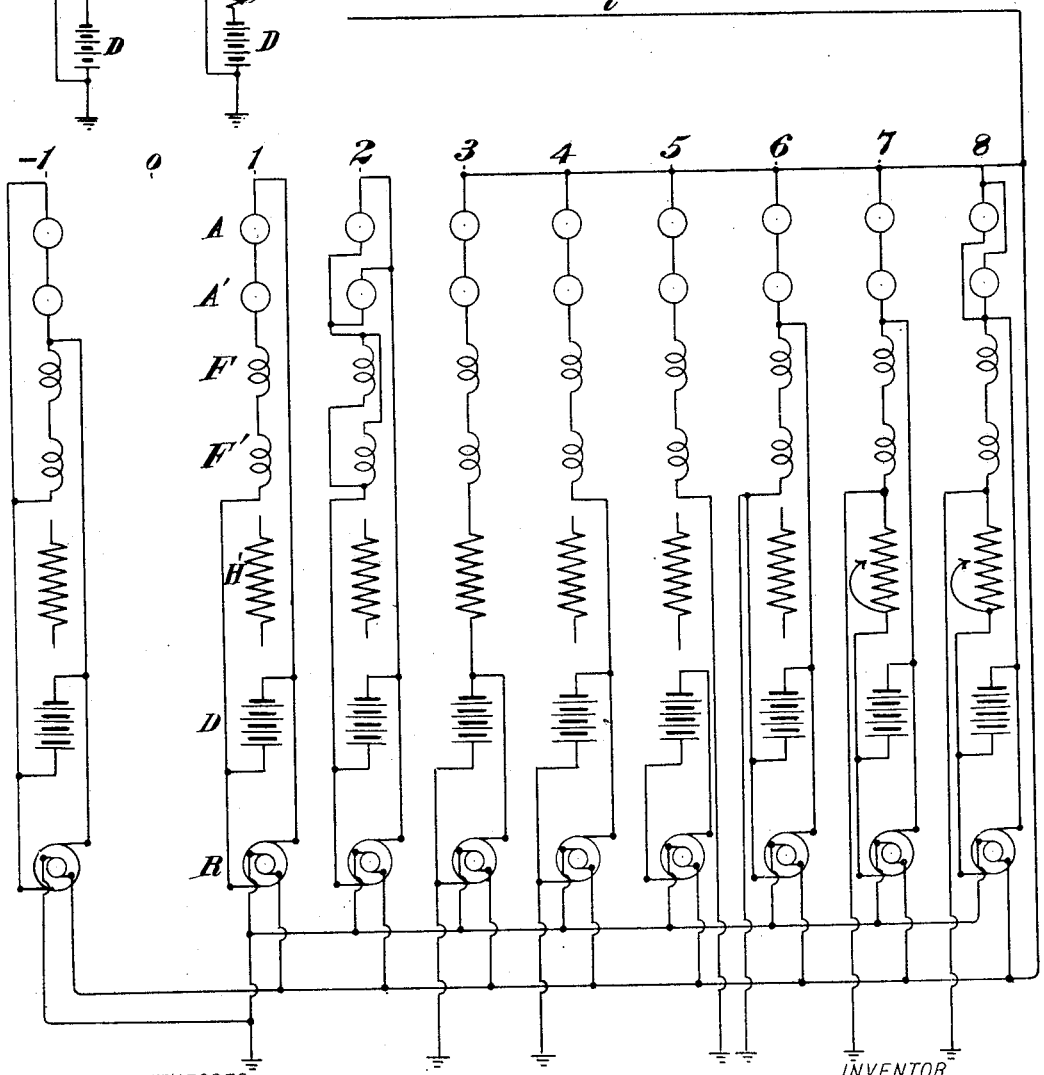

UNITED STATES PATENT OFFICE.

CHARLES J. REED, OF PHILADELPHIA, PENNSYLVANIA.

MEANS FOR OPERATING AND CONTROLLING ELECTRIC MOTORS.

SPECIFICATION forming part of Letters Patent No. 685,795, dated November 5, 1901.

Application filed March 22, 1899. Serial No. 710,039. (No model.)

*To all whom it may concern:*

Be it known that I, CHARLES J. REED, a citizen of the United States, residing at Philadelphia, in the county of Philadelphia and State of Pennsylvania, have invented a new and useful Improvement in Means for Operating and Controlling Electric Motors, (Case No. 815,) of which the following is a specification.

My invention relates to the operation and control of electric motors; and it has for its object to provide a means for operating and controlling either a single motor or a plurality of motors advantageously at variable speed without unnecessary waste of energy.

In direct-current motors for gradually accelerating working speeds as heretofore employed it has been usual to connect each armature and the corresponding field-magnet winding in series and to vary the power and speed by varying the amount of external resistance included in circuit, and where two or more motors are employed for driving a common load to also vary the circuit connections, so that the motors are connected in series and in parallel for different rates of speed. In starting such motors under load it is necessary in order to avoid injury to the motors by reason of excessive current to introduce a considerable amount of external resistance into the circuit, this being reduced as the counter electromotive force increases with the acceleration in the speed of the motors. After passing from series to parallel connection of the motors where the armature and field-magnet windings of each motor are connected in series it is also usual to insert a large amount of resistance into the circuit and to gradually cut out such resistance in order to increase the speed to a maximum. This insertion of dead resistance into the circuit in starting and after changing from series to parallel connection is extremely wasteful of energy by reason of the fact that all of the current absorbed in the resistance is converted into heat, and therefore wasted, so far as the production of mechanical motion is concerned. In the use of "series-wound" motors the energy expended in overcoming the inertia of the load in stopping is also wasted, and where the service involves starting and stopping at frequent intervals and intermediate running at comparatively high speeds the amount of energy converted into heat or otherwise expended wastefully is very large.

By my present invention I propose to supply the armature and the field-magnet of the motor with substantially independent currents, either from the same or from separate sources, and to provide a variable resistance, more or less of which may be included in the field-magnet circuit. The amount of this resistance which is included in the field-magnet circuit is automatically regulated by the armature-current. Inasmuch as the latter is dependent upon the load, the field-magnet excitation will be automatically regulated so as to provide for variations in the load.

While I propose to make the counter electromotive force depend largely upon the armature-current, I propose also to make it capable of independent variation to a certain extent.

I desire it to be understood that my invention is adapted for use in connection with one or a plurality of direct-current motors employed for driving any load where the motor is to be started under load, varied as to speed, and stopped at more or less frequent intervals irrespective of the particular service.

Where two or more motors are employed in conjunction with each other the common load will more generally be a railway-vehicle or a number of such vehicles constituting a train; but, as I have already stated, the invention is not limited in this respect.

In the accompanying drawings, Figure 1 is a diagram of a single motor and the accompanying controller and accessories, the controller-drum being indicated as developed into a plane. Fig. 2 is a diagram of the circuits embodied in the apparatus shown in Fig. 1. Figs. 3 and 4 are diagrams corresponding, respectively, to Figs. 1 and 2, but showing a different form of controller and a different combination of apparatus. Figs. 5 and 6 correspond, respectively, to Figs. 3 and 4, but show a controller and connected apparatus adapted for two motors. Fig. 7 is a plan view of a portion of a controller adapted for two motors, and Fig. 8 is a plan view of a portion of the mechanism shown in Fig. 7. Fig. 9 is a front elevation of a controller adapted for use in connection with two motors. Each of Figs. 7, 8, and 9 is largely diagrammatic and is intended merely to show a means whereby the circuit changes illustrated in the preceding figures may be effected. Fig. 10 is a diagram of circuits, illustrating the operation and control of two motors by a modified system. Figs. 11 and 12 are diagrams of modified circuits.

Referring now particularly to Figs. 1 and 2, the stationary contact terminals or fingers $a$, $a'$, $a^2$, $a^3$, $a^4$, $a^5$, $a^6$, $a^7$, and $a^8$ of the controller are shown as in the zero or "off" position and the drum B as provided with contact-strips $b$, $b'$, $b^2$, $b^3$, $b^4$, $b^5$, $b^6$, $b^7$, $b^8$, $c'$, $c^2$, $c^3$, $c^4$, $c^7$, and $c^8$, having such lateral arrangement as to engage the contact-fingers in the proper order to make the circuit connections indicated in Fig. 2. The working positions of the controller-drum and the corresponding circuit connections are designated as 1, 0, and −1. The terminals of the armature A are the fingers $a'$ and $a^2$, and the armature-circuit includes a coil C′ of an electromagnet C, the core of this magnet being also provided with a coil $C^2$, preferably of fine wire, wound in the reverse direction to that of the coil C′ and having one terminal connected to the positive terminal of a secondary battery D and its other terminal connected to one end of a suitable resistance E. This resistance is subdivided and connected to contact-pieces $e$. The movable switch-arm $e'$ of the rheostat is connected to the negative terminal of the secondary battery D. This terminal of the battery is also connected to contact-finger $a^8$. The terminals of the field-magnet winding F of the motor are connected to fingers $a^3$ and $a^4$. The armature G of the magnet C is mounted upon a lever-arm G′, pivoted to a stationary support at one end and having its free end pivoted to rod $G^2$, provided with a projection $g$, extending beneath a series of carbon blocks or plates H. These carbon blocks or plates H are severally connected to different points in a resistance H′ of suitable character and proportions, the end terminals of this resistance being connected to fingers $a^5$ and $a^6$. The uppermost carbon block or plate may rest against a stationary stop, or, as shown in Fig. 1, may be engaged by one end of a pivoted lever I, the other end of which is connected through a link I′ and a laterally-projecting arm $I^2$ to the rod $G^2$, so that when the latter is drawn upward by means of the magnet C acting upon the armature G the carbon blocks H will be pressed toward each other to bring them successively into contact with each other, and thus short-circuit a portion or all of the resistance H′. A coiled spring J, one end of which is connected to the armature-supporting lever G and the other end of which is connected to a stationary bracket K, is provided in order to oppose the pull of the magnet to such extent as may be found desirable. The tension exerted by this spring may be adjusted by a nut J′ or other adjusting means. When the drum B is rotated in the forward direction until the fingers $a$ to $a^8$ are in position 1, the armature will be supplied with current from the line, (designated by $l$,) and the field-magnet F will be energized by current from the secondary battery D. The amount of current flowing from the battery through the field-magnet winding will be automatically regulated in accordance with the load by the amount of current flowing through the armature, since this current will energize the magnet C, and the latter will act through its armature and the connected mechanism upon the carbon blocks to decrease the resistance of the field-magnet circuit by shunting more or less of the current through the carbon blocks or plates or by short-circuiting the resistance altogether. The speed of the motor may be independently varied by means of the rheostat E, since the pull of the magnet upon its armature may be varied by including more or less of the resistance in the circuit of the opposing coil $C^2$, and thus varying the demagnetizing-current supplied thereto from the secondary battery D. It will thus be seen that so long as the action of the coil C′ is opposed by a constant force any change in the armature-current due to a change of load will produce in the field-current and in the motor speed a change corresponding to that change of load; but a change in the force opposed to the action of the coil C′, whether mechanical or electromagnetic, or both, causes a change in the relation between the armature and field currents and a corresponding change in motor speed which is independent of changes in load. In order to stop the motor, the drum will be moved in the reverse direction to bring the fingers $a$ $a'$, &c., into the zero position; but this will not serve to stop the motor, since it merely opens the circuits. Consequently the drum will be moved a further notch beyond the off position, thus bringing it into position −1, in which position a closed circuit is established, which includes the secondary battery and the motor, the armature and field-magnet being in parallel. In moving to position −1 the circuit is first closed between the battery and the field-magnet winding, and subsequently the circuit is closed through the armature. To accomplish this, the contact-strips $c^3$, $c^4$, $c^7$, and $c^8$ are longer than the contact-strips $c'$ and $c^2$, as shown. In position −1 the motor becomes a generator, and thus acts as a brake, and at the same time charges the battery.

It will be understood that with the arrangement just described the rheostat, or at least the switching portion of it, and the other mechanism may, if desired, be embodied in the controller, so that the operating-handle of the controller may serve by its normal operation to effect the necessary changes to secure the starting, stopping, and variation of speed of the motor.

In Figs. 3 and 4 I have shown a modified system for operating and controlling a single electric motor including, for the purpose of additional regulation, a resistance adapted to be inserted in the main circuit. In these figures the drum B' is shown as having eight positions on one side of the zero or off position and a single stopping or braking position on the other side. Positions 1, 2, 3, 4, and 5 are running positions—*i. e.*, positions in which the controller may be stopped for any desired length of time—and positions $3^a$, $3^b$, and $4^a$ merely represent intermediate positions, in which the circuits are changed in order to facilitate the making of the circuit connections corresponding to the succeeding running positions. The controller-fingers $a^9$ to $a^{16}$ engage with the strips $b^9$ to $b^{24}$, that are correspondingly located laterally on the drum B' as the latter is rotated positively and with the strips $c^9$ to $c^{15}$ when the drum is rotated negatively to position $-1$. The terminals of armature A are connected to fingers $a^9$ and $a^{10}$, and the armature-circuit includes a solenoid or magnet-coil $C^3$. The core $C^4$ of this solenoid, which might obviously be an armature of a magnet, the same as is indicated in Fig. 1, is provided with a rod $G^3$, having a projection $g'$ to engage with the upper one of a series of carbon blocks or plates H, the latter being severally connected to different portions of a suitable resistance H', the same as in Fig. 1. A spring J is also interposed between the rod $G^3$ and a suitable stationary bracket K', a crank-arm $J^2$ being shown as a means for varying the tension of the spring in order to vary the force opposed to the action of the armature-current acting through the coil $C^3$, this means being employed in lieu of the rheostat E and the demagnetizing-coil $C^2$. (Shown in Fig. 1.) The terminals of the field-magnet winding F are connected to fingers $a^{11}$ and $a^{12}$, the terminals of the resistance H' to fingers $a^{13}$ and $a^{14}$, and the positive terminal of the secondary battery D to finger $a^{15}$. The negative terminal of the battery is permanently connected to finger $a^{14}$, and the finger $a^{16}$ is connected to ground. With this arrangement of circuits when the drum is moved into position 1 the armature A, field-magnet F, secondary battery D, and resistance H' are all in series, the battery being so connected as to oppose the line-current—that is to say, it is in position to be charged by the current flowing from the line through the motor. In position 2 the armature and field-magnet are connected in series with the battery and the resistance is short-circuited. In position 3 the armature and field-magnet are in series with the battery and the resistance is cut out. In position $3^a$ the armature, the field-magnet, and the battery are in series and the resistance and battery are in parallel relation. In position $3^b$ the armature and field-magnet are connected in series with the resistance and the battery is cut out. In position 4 the resistance is short-circuited and the battery cut out. In position $4^a$ the battery and field-magnet winding, in parallel, form part of the armature-circuit, the field-magnet branch including the short-circuited resistance. In position 5 the connections are the same as in position $4^a$, except that the short circuit on the resistance is open and the amount of resistance opposing the current in the field-magnet branch is governed by the regulating apparatus of which the coil $C^3$ is the controlling member. Until position $4^a$ is passed the mechanism for varying the amount of resistance in the field-magnet circuit will be preferably locked, so that such resistance is invariable. Before the position 5 is reached the mechanism is released, so that the resistance, and therefore the counter electromotive force, may be automatically varied with variations in the load and so that the force exerted against the action of coil $C^3$ may be independently varied in order to vary the motor speed independently of the load, as will be hereinafter described. Position 5 may extend over a considerable portion of the drum, so as to provide for a wide range in speed, by varying the tension of spring J or by varying the demagnetizing-current through the agency of the rheostat. (Shown in Fig. 1.) In stopping the motor the drum will be returned gradually to zero position at such a rate of movement as will provide the rate of retardation desired, and then a further step to the position $-1$ to effect a complete stop. In this position the motor and battery are cut off from the line 2 and the motor acts as a generator to charge the battery and to serve as a brake, the armature and field-magnet being connected in parallel.

Referring now to Figs. 5 and 6, the controller-drum $B^2$ is shown as divided, so as to bring the negative or braking contacts at the right instead of at the left, as in the preceding figures. In the system here shown two motors are employed, and while a single field-magnet winding F is shown it is to be understood as merely indicative that the connection of the field-magnet windings of the two machines is such as to constitute, in effect, a single winding, so far as the circuit changes are concerned. Mechanically there will obviously be two separate windings; but they may be fairly represented by a single winding in the sense above specified. As shown in these figures, the terminals of the armatures A and A' are respectively connected to fingers $a^{17}$ and $a^{18}$ and $a^{19}$ and $a^{20}$, and the respective armature-circuits include the coils $C^5$ and $C^6$ of an electromagnet or solenoid, in this case shown as a solenoid. The two coils $C^5$ and $C^6$ are arranged for a single core $C^7$, which is provided with a rod or stem $G^4$, having a projection $g^2$ coöperating with a stationary stop or bracket $I^2$ for the purpose of drawing the carbon blocks or plates H together when the solenoid is energized sufficiently to overcome the tension of the spring J, an adjusting device $J^2$ being shown for varying the tension of the spring. The carbon blocks or plates H are connected to the sections of a suitable resistance H', as in the preceding figures. The terminals of the field-magnet windings F are connected to the fingers $a^{21}$ and $a^{22}$, one terminal of the resistance H' being connected to finger $a^{23}$ and the other terminal to the negative terminal of the secondary battery D and also to the ground. The positive terminal of the battery is connected to finger $a^{24}$ and the negative terminal to finger $a^{25}$. The drum-contact strips $b^{17}$ to $b^{20}$, corresponding to the power positions, are so arranged and interconnected as to insure circuit changes when the drum is rotated positively, as follows: In position 1 the armatures and field-magnets are connected in series with the battery, so that the latter is charged by the line-current and exerts a counter electromotive force in the line, the resistance being out of circuit. In position $1^a$ the relation of the motors and battery is the same as in position 1; but the resistance is included in parallel with the battery. In position $1^b$ the battery is cut out and the resistance is included in series with the motors. In position 2 the battery is cut out and the resistance is short-circuited. In position 3 the positive terminal of the battery is connected between the armatures and the field-magnets of the motors and the resistance is short-circuited, the excitation of the field-magnets being thus dependent in part upon the battery. Up to this point the mechanism for varying the resistance is preferably locked, as will be hereinafter described, so that the resistance is utilized in its full capacity without variation. In position 4 the resistance is in the field-magnet circuit, but is varied by the automatic mechanism described to vary the strength of the field-magnet current, the positive terminal of the battery being connected to the positive terminal of the field-magnets, so that the armature-current is divided between the battery and the field-magnet in accordance with the strength of the armature-current and the resistance of the field-magnet circuit. Position 4 represents a considerable circumferential surface of the drum in order that a comparatively wide variation in motor speed may be effected by varying the tension of the spring J or by the electromagnetic variation indicated in Fig. 1, while the circuit connections are as here indicated. Position $4^a$ is the same as position 4, except that the resistance in the field-magnet circuit is entirely short-circuited. This connection is made at the instant preceding the opening of the armature-circuit and on being made causes a sudden increase of the field-current and of the counterelectromotive force of the motor, tending to entirely stop the armature-current for a short period during which the speed has not had time to materially change. Position $4^b$ represents the connection and conditions described for position $4^a$ after the armature-circuit has been opened. Position $4^c$ is the same as position $4^b$, except that the armature-circuits have been closed in parallel, the strong field being maintained. In position 5 the circuits are the same as in position $4^c$, except that the short circuit is removed from the variable resistance, so that the latter is susceptible of automatic variation by means of the armature-currents. This position occupies a considerable portion of the drum for the same reason as that stated in connection with position 4. In position 1 the battery is charged and the motors provide the braking action incident to their operation as generators.

In Figs. 7, 8, and 9 I have shown controller mechanism adapted for controlling two electric motors substantially in the manner indicated in Figs. 5 and 6. A controller-drum $B^2$, provided with the contact-strips $b^{17}$ to $b^{20}$ and $c^{17}$ to $c^{25}$, properly arranged and connected, is mounted upon a shaft L, having at its upper end an operating-handle L', as is usual in devices of this character. At one side of the drum are located the stationary circuit-terminals in the form of contact-fingers $a^{17}$ to $a^{25}$, adapted to engage the strips on the drum as the latter is rotated by means of the handle L'. On the shaft below the drum is mounted a plate or disk M, provided with notches 1, 0, 1, 2, 3, 4, and 5, corresponding, respectively, to the braking and zero positions and the several running positions. The space between notches 1 and 2 is the space represented in Figs. 5 and 6 as positions $1^a$ and $1^b$, this being merely wide enough to permit of the momentary changes in circuit connections indicated in Fig. 6. Position 4 is represented by two notches and an intervening space of considerable width, this space being provided in order to secure a variation in speed, while the circuit connections are as indicated at position 4 in Fig. 6. The disk is also provided with two notches and a comparatively wide intervening space corresponding to position 5 for the same reason as that specified in connection with position 4. Projecting from the frame $L^2$ of the controller is a spring-arm N, having a roller N' to engage with the periphery of the disk M, so as to indicate to the motorman the several positions of the drum. Another plate M' is mounted upon shaft L below plate M. The upper side or face of this disk is shown as provided with an annular recess one portion $M^2$ of which is comparatively narrow—that is, it has an outer wall that is nearer the axis of the drum than the corresponding wall of the remaining portion $M^3$. A roller O' is mounted in the end of an arm O and is located in this annular recess $M^2$ $M^3$, so as to be guided by its outer wall. The other end of the arm O is attached to an arm $G^5$, constituting or provided with an armature for the magnet $C^8$, the coils of which are in the armature-circuit, as indicated in Fig. 5, these coils being to all intents and purposes the same as the coils $C^5$ and $C^6$ of said figures. The free end of this armature $G^5$ is in position to engage one of the carbon plates or blocks H when drawn inward by the energized magnet, thus short-circuiting the resistance H'. The outer wall M² of the groove M² M³ constitutes, together with the arm O and its roller O', the locking device for preventing variation of the resistance H' between positions 1 and 4 of Fig. 6, since the wall engages the roller O' and prevents the armature G⁵ from moving toward the magnet C⁸ whatever may be the strength of the current flowing through the magnet. The periphery of plate M' is in the form of a cam, with which engages a roller P', mounted in the end of an arm P, the latter being connected to the armature G⁵ by means of a spring or a rod Q, embodying a coiled spring Q', the latter being fastened to the arm P by means of an adjusting-nut R and a set-nut R', so as to adjust the tension of the spring Q, if desired. This cam and lever mechanism constitutes the mechanical device for varying the force exerted against the coils in the armature-circuits in order to vary the speed of the motors independently of the load. The cam-surface is so designed and proportioned that the tension of the spring will be increased from the beginning to the end of position 4 and also from the beginning to the end of position 5, the additional tension being removed before making the circuit changes indicated at 4ᵃ, 4ᵇ, and 4ᶜ. This means, as has already been indicated, is, in effect, the substantial equivalent of the electromagnetic means shown in Fig. 1 so far as the resulting variation of motor speed is concerned.

It may sometimes be desirable to use as the auxiliary source of energy instead of a storage battery alone either a motor-generator alone or a storage battery and motor-generator combined. I have shown in Fig. 10 a diagram of the circuits and circuit changes in a system embodying both a secondary battery and a motor-generator as the auxiliary source of energy. In this case the motor-generator is adapted to transform the current taken from the main source and deliver it at a constant or nearly constant potential to the terminals of the secondary battery. One purpose of this motor-generator is to maintain the charge in the secondary battery, and another purpose is to assist the secondary battery under a heavy discharge. Another purpose served by the motor-generator is to absorb the excess of current during excessive charge of the battery and after transforming it return it to the source of supply. I have shown the circuit connections corresponding to power positions 1, 2, 3, 4, 5, 6, 7, and 8 of a suitable controller for this system and the circuit connections for the braking position 1 of such a controller. In position 1 the armatures A and A' and the field-magnet windings F and F' of the two motors are connected in series and are supplied with energy by the secondary battery D and the motor-generator R in conjunction, the amount of energy supplied by the battery being dependent upon its condition as to charge. The primary winding of the motor-generator in this and in all the succeeding positions is connected to the line $l$ and to the ground, and in position 1 the resistance H' is out of circuit. In position 2 the motors are connected in parallel and are supplied with energy by the battery and the motor-generator, the same as in position 1. In position 3 the motors and resistance are connected in series and are supplied from the line $l$, the battery and secondary coil of the motor-generator in parallel being also included in series in circuit with the motors. In position 4 the connections are the same as in position 3, excepting that the resistance is taken out of circuit. In position 5 the motors in series are connected directly to the source of supply, the battery resistance and secondary coil of the motor-generator being out of circuit. In position 6 the armatures and fields of the motors are connected in series to the main source of supply, as in position 5, and the battery and secondary coil of the motor-generator are connected in parallel with the field-coils, giving the fields in this position a source of supply independent of the armature-current. In position 7 the connections are the same as in position 6, except that a variable resistance H' is inserted in the field-circuit between the field-coils and the battery. In this position variations in speed due to changes of load are automatically made, and independent variations of speed are made in the manner and by the means heretofore described. In position 8 the connections are the same as in position 7, excepting that the armatures are connected in parallel instead of in series. In position 1, corresponding to a backward motion of the controller beyond the off position, the armatures in series are connected to the terminals of the battery and the fields in series are connected to the terminals of the battery, the connections being such that the motors act as generators, tending to either charge the battery or send the overflow, if the current is excessive, back to the source of supply through the motor-generator transforming in the opposite direction.

The structure and mode of operation of the controlling mechanism employed in the system illustrated in Fig. 10 may in general be the same as have already been described in connection with preceding modifications in order that the resistance may be invariable until position 7 is reached and in order that positions 7 and 8 may represent continuing conditions to such an extent as to permit of the desired variation in speed.

In Figs. 1 to 10 I have shown the field-magnet winding or windings and the variable resistance as connected in series and the battery-terminals as respectively connected between the armature or armatures and the field-magnet winding or windings and to the ground in the positions corresponding to variations of speed independently of variations in load.

In Fig. 11 I have shown a modification of circuit connections for independent speed-varying conditions in which the variable resistance H', the battery D, and the armature A are all connected in series between the line and the ground and the terminals of the field-magnet winding are respectively connected between the armature and the resistance and to the negative terminal of the battery.

In Fig. 12 I have shown a further modification in which the variable resistance is in two parts $h$ and $h'$, the circuit connections being the same as in Fig. 11, except that each of the branches leading from the armature to ground contains one of the resistance-divisions.

It is evident that with any of the arrangements shown the amount of resistance included in the field-magnet circuit may be made automatically dependent upon the strength of the armature-current and be also independently variable.

While the arrangement shown in Figs. 1 to 10 or that shown in Fig. 11 is regarded as particularly desirable on account of economy in the consumption of energy, conditions may arise which will make it desirable to employ the arrangement shown in Fig. 12.

While I have designated the ground as the "negative" or "return" conductor of the system hereinbefore described, I do not intend to limit the invention to any specific kind or location of return-circuit.

In cases where electromagnetic means for independent regulation similar to that shown in Fig. 1 is employed in connection with the operation and control of two or more motors the independent regulator should be restored to its initial condition whenever the armatures are changed from series to parallel.

It will be understood that the means shown and described are merely illustrative of a large variety of devices that might be employed for effecting the desired results. It will also be understood that more than two motors may be employed and that the circuit changes may be widely varied from those shown without departing from the spirit and scope of my invention. I desire it to be also understood that the carbon blocks shown in connection with the field-magnet-circuit variable resistance may be replaced by contacts of other conducting material or that they may be used in conjunction with metal contacts for taking the arcs when the short circuit is taken off in a manner well known in the art.

I make no claim herein to the method of operating and controlling electric motors set forth, the same being made the subject-matter of an application, Serial No. 59,326, filed May 8, 1901, as a division of this application.

I claim as my invention—

1. The combination with an electric motor having its armature and field circuits supplied from separate sources of electrical energy, of means controlled by variations in the armature-current for effecting correlative variations in the field-current.

2. The combination with an electric motor having substantially independent armature and field currents, of means controlled by variations in the armature-current to produce correlative variations in the field-current.

3. The combination with an electric motor having substantially independent armature and field currents, of electromagnetic means controlled by variations in the armature-current to produce correlative variations in the field-current.

4. The combination with an electric motor having substantially independent armature and field currents, of electromechanical means controlled by variations in the armature-current to produce correlative variations in the field-current.

5. The combination with an electric motor having substantially independent armature and field currents, of means controlled by variations in the armature-current to produce correlative variations in the field-current and means for varying the correlative relation between the strength of the armature-current and the strength of the field-current.

6. The combination with an electric motor having substantially independent armature and field currents, of means controlled by variations in the armature-current to produce correlative variations in the field-current and electromagnetic means for varying the correlative relation between the strength of the armature-current and the strength of the field-current.

7. The combination with an electric motor having substantially independent armature and field currents, of means controlled by variations in the armature-current to produce correlative variations in the field-current, and mechanical means for varying the correlative relation between the strength of the armature-current and the strength of the field-current.

8. The combination with an electric motor having substantially independent armature and field currents, of means controlled by variations in the armature-current to produce correlative variations in the field-current, means for varying the correlative relation between the strength of the armature-current and the strength of the field-current, and a switching device adapted to change the connections of the component parts of the several circuits.

In testimony whereof I have hereunto subscribed my name this 17th day of March, 1899.

CHARLES J. REED.

Witnesses:
 JAMES W. LAWS,
 ROBT. B. FLETCHER.